United States Patent Office 2,754,219
Patented July 10, 1956

2,754,219
ANTI-MISTING PRINTING INKS

Andries Voet and Alden Emil Yelmgren, Borger, Tex., assignors to J. M. Huber Corporation, Borger, Tex., a corporation of New Jersey No Drawing. Application March 9, 1953,
Serial No. 341,355

5 Claims. (Cl. 106—32)

This invention relates to printing inks having valuable anti-misting properties and to methods for the preparation of such printing inks.

The speed of printing presses has been increased so much that web speeds of 1200 ft. per min. or more are common practice. The high speed has caused an increasing nuisance in the press room from ink which leaves the running presses in the form of a very fine mist. This ink mist contaminates everything in the press room, causing spoilage of material and great expense for continually cleaning the entire room and contents. In extreme cases the mist near the press is sufficient to constitute a fire hazard.

Attempts to alleviate this problem have previously been directed toward methods of collecting the mists by means of adequate ventilating equipment and means for filtering and removing the suspended ink from the air stream before it is discharged to the outside atmosphere. Such methods have proven to be costly, inefficient and difficult to operate.

The purpose of this invention is to provide new and improved printing inks and, more particularly, to provide printing inks which will operate on high speed presses with little or no misting. A further object is to provide a method for the preparation of substantially non-misting or press resident printing inks.

According to the present invention, it has been found that these objects can be accomplished by adding to an ink of which the principal vehicle constituent is a hydrocarbon containing an aromatic constituent, a finely divided organic derivative of montmorillonite in which the organic constituent includes a chain of at least 12 carbon atoms. Montmorillonite derivatives suitable for this purpose are formed by adding to bentonite, of which montmorillonite is the main constituent, an amine salt or a quaternary ammonium compound of the general formula

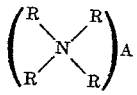

in which one R is a hydrocarbon chain of at least 12 carbon atoms, another R is hydrogen or hydrocarbon, each other R is hydrogen or hydrocarbon or the carbon atoms of a single cyclic group, i. e., a group of atoms in a single cyclic structure, and A is an anion, i. e., a negative element or radical. The bentonite usually employed to make these derivatives is a swelling type of bentonite, which usually is considered to be principally sodium montmorillonite.

When an ink made as here described is worked on an ordinary roller ink mill the material assumes a buttery consistency. This consistency exists when the material is at rest or under relatively low shear; but when it is subjected to high shear, the buttery consistency is broken down to produce a fluid ink suitable for printing. For this reason the material acts normally and prints well once it is placed on the inking system of a press. Such a material, however, will not distribute satisfactorily in the conventional fountains of high speed rotary presses.

According to a further feature of this invention, it has been found that anti-misting printing inks can be prepared which may be used with various types of ink distributing systems, by employing the organic derivative of montmorillonite in a very finely divided condition and incorporating it into the ink by means of stirring equipment that does not produce high shear. Under these conditions an ink with good flow properties is obtained, one that can be distributed satisfactorily in the conventional fountains and ink distributing systems of high speed presses. Such an ink is subjected to high shear on the rollers of the distributing system, and when a sample of the ink is removed from an inking roller it is found to have a buttery consistency. This is a normal characteristic of the inks here disclosed.

The organic bentonite derivatives employed according to this invention have the capacity to swell in liquid hydrocarbons, in which they tend to produce gels. Their swelling capacity, however, is greater in aromatic hydrocarbons than in aliphatic hydrocarbons, and inks containing them assume desirable non-misting properties only when the hydrocarbon vehicle or oil used in the ink contains about 15% or more of aromatic matter. When 15% of the bentonite derivative is added in finely powdered form to an aliphatic mineral oil it does not form a gel on short standing, but a like addition to a mineral oil containing about 15% or more of aromatic matter gives a gel forming mixture which after several hours will no longer flow.

Such a mixture is useful in the preparation of inks with reduced misting tendency, but its property of soon acquiring a non-fluid or buttery consistency would prevent its use in the distributing systems of high speed presses. It has been found further, however, that this shortcoming is avoided when an ink is made by compounding such a gel forming mixture with pigment. The presence of pigment in the ink delays the gelling action for an extended period of time which ranges from a minimum of several days up to several months or more. The exact action of the pigment is not fully understood but may be due to a mechanical protection of the organic bentonite derivative. The protective action appears to increase with the fineness of the pigment particles and is pronounced in the use of extremely fine pigments, such as carbon black. When an ink so compounded is subjected to high shear such as that on a three roller mill or on the distributing system of a high speed press, the gel-delaying effect of the pigment is destroyed, and when the shearing action ceases the ink immediately assumes a buttery consistency.

In preparing the inks of this invention the preferred method consists in preparing a normal ink by any usual method such as with colloid mills, three roller mills, ball mills, etc., in which the pigment becomes well dispersed by the high shear obtained in the process. This dispersion of pigment in the vehicle constitutes a normal ink and has the normal tendency to mist. The organic derivative of bentonite in a finely divided condition and usually predominately material which would pass a 325 mesh screen is then sifted into the ink and incorporated by mixing or stirring with equipment in which the moving parts do not have close clearance. Ribbon mixers, dough mixers or propeller type mixers are satisfactory. Ink so treated appears to be unchanged and has normal flow properties but is in a condition to become nonmisting in character after being subjected to shear such as by a single pass through a three roller mill or during passage over the rolls of an ink distributing system. As little as two per cent of the bentonite derivative will produce a marked decrease in misting and about six per cent to eight per cent will produce the full effect. The use of larger amounts is not harmful.

Organic derivatives for use according to this invention can be prepared easily by slurrying a swelling bentonite in water and then adding an ammonium compound of the formula above indicated, whereupon the organic derivative immediately separates from the slurry. They may also be prepared by dispersing finely divided bentonite in an ink oil containing the dissolved ammonium salt. Preparation by this method is usually hastened by heating the mixture to a temperature of about 80 to 110° C.

Among the ammonium salts which have produced effective bentonite derivatives are:

Dodecyl ammonium chloride
Dodecyl ammonium acetate
Tetradecyl ammonium acetate
Hexadecyl ammonium acetate
Octadecyl ammonium acetate
Octadecenyl ammonium acetate
Diphenyl, octadecyl guanidine bromide
Didodecyl, dimethyl ammonium chloride
Octadecyl, decyl, dimethyl ammonium chloride
1 hydroxy ethyl, 2 heptadecenyl glyoxalidine acetate
1 amino ethyl, 2 heptadecenyl glyoxalidine acetate
Didodecyl ammonium acetate The misting properties of inks may be tested in the following manner. Two independently driven horizontal steel rollers 2.5 inches in diameter by 6 inches long are rotated toward one another so that the motion between the two rollers is downward. One roller is provided with a slow endwise oscillating motion of 0.5 inch to maintain distribution of the ink on the rollers. One and one-half grams of ink are placed on the rollers with the distance between the rollers adjusted so that both rollers contact the film of ink between them. The rollers are then rotated at 1200 R. P. M. with a weighed piece of aluminum foil 3 inches square placed centrally 3 inches below the rollers. After 3 minutes the aluminum foil is removed and weighed to determine the amount of ink mist which has deposited. Results obtained with this instrument have been found to correspond with tests of the same inks which were run on high speed presses in actual production.

The inks of this invention are further illustrated by the following examples wherein the parts given are parts by weight.

Example 1

A black news ink was prepared by ball milling a mixture of 12 parts of pelletized channel black, one part of gilsonite and 87 parts of a mineral oil having an aniline point of 81, until the carbon was well dispersed and an ink resulted of 18 poise in viscosity and of good length. Ninety-four parts of this ink was treated by stirring into the ink, with a slow speed propeller type agitator, six parts of powdered didodecyl dimethyl ammonium chloride derivative of a swelling bentonite. After this treatment the flow and viscosity of the ink were only slightly altered. Portions of the normal ink and the treated ink were each subjected to a misting test in the manner above described. The normal news ink misted 49 milligrams in 3 minutes, while the treated ink misted only 4 milligrams.

Example 2

Inks were made up as in Example 1 except that the oil was a white refined mineral oil with no aromatic content. The misting of the treated and untreated inks was 52 and 50 milligrams, respectively. The addition of 15% of toluene to the treated ink gave an ink which misted only 9 milligrams.

Example 3

A mineral oil having an aromatic content of about 15% as determined by sulfonation was pigmented with barium Lithol red to produce a red news ink having good flow and a viscosity of 36 poises. It was found to mist 43 milligrams under the standard test. It was then treated by stirring into the ink seven per cent of its weight of a powdered addition product of dihexadecyl dimethyl ammonium acetate and Wyoming bentonite. The ink was increased slightly in viscosity and the misting was reduced to 3 milligrams.

Example 4

A black news ink was prepared by incorporating 12 parts of carbon black and 1 part of gilsonite into an oil having an aromatic content of about 35%. This ink misted 54 milligrams. 100 grams of this ink was then treated by stirring in 6 grams of powdered bentonite and 5 grams of 1 hydroxy ethyl 2 heptadecenyl glyoxalidine acetate and heating to 105° for 20 minutes. On cooling an ink with normal flow properties resulted whch misted only 7 milligrams.

Example 5

100 grams of a black news ink prepared with an oil having an aromatic content of about 25% was treated with 6 parts of the bentonite derivative of various ammonium compounds by stirring the powdered derivative into the ink. The amount of misting was then determined, as shown by the following table:

| Ammonium compound: | Milligrams of mist |
|---|---|
| None | 53 |
| 1 amino ethyl 2 heptadecenyl glyoxalidine acetate | 5 |
| Dioctadecyl ammonium acetate | 11 |
| Didodecenyl ammonium chloride | 21 |
| Didodecyl dimethyl ammonium chloride | 5 |
| Dioctadecyl dimethyl ammonium acetate | 1 |
| Hexadecyl ammonium acetate | 24 |
| Octadecyl phenyl methyl ammonium bromide | 19 |

Example 6

The base ink of Example 5 was treated by stirring in various amounts of the dioctadecyl dimethyl ammonium derivative of bentonite, with the following results:

| Grams derivative in 100 grams of ink: | Milligrams of mist |
|---|---|
| 0 | 53 |
| 2 | 40 |
| 4 | 16 |
| 6 | 1 |
| 10 | .9 |
| 20 | .9 |

While it has been found that a certain amount of aromatic matter must be present in the ink it is not possible to state that in all cases a certain minimum or more is required because the nature of the remainder of the oil exerts some influence. Highly unsaturated hydrocarbon vehicles or naphthenes, while not useful alone, require the presence of smaller amounts of aromatic matter than do other hydrocarbon vehicles. The suitability of an oil may be easily and quickly determined by stirring 20 grams of the finely divided organic bentonite derivative into 100 parts of the oil and passing the mixture once over the rolls of a 3 roller ink mill. A satisfactory oil will produce a homogeneous, translucent, very viscous or buttery gel, while an unsatisfactory oil maintains much of the properties of the original mixture.

The bentonites employed according to this invention are all of the swelling type and may vary considerably in chemical constitution. In general they are montmorillonite containing minerals having a high silica and low alumina content, and they may contain small amounts of such materials as magnesium and calcium. Suitable powdered bentonite will absorb at least about four volumes of water.

We claim:

1. An anti-misting printing ink comprising a fluid dispersion, in a liquid ink vehicle consisting essentially of liquid hydrocarbon containing at least about 15% of aromatic hydrocarbon oil, of finely divided coloring pigment and at least 2%, based on the ink weight, of a finely divided addition product of a swelling bentonite and a quaternary nitrogen compound containing a chain of at least 12 carbon atoms, said dispersion normally having a fluid consistency but being convertible to a substantially gelatinous consistency by shearing it between rotating rollers.

2. An anti-misting printing ink comprising a fluid dispersion, in a liquid ink vehicle consisting essentially of liquid hydrocarbon containing at least about 15% of aromatic hydrocarbon oil, of carbon black and at least 2%, based on the ink weight, of a finely divided addition product of a swelling bentonite and a quaternary nitrogen compound containing a chain of at least 12 carbon atoms, said dispersion normally having a fluid consistency and being convertible to a substantially gelatinous consistency by shearing it between rotating rollers.

3. The method of preparing an anti-misting printing ink which comprises shearing a mixture of finely divided pigment and a liquid ink vehicle consisting essentially of liquid hydrocarbon containing at least about 15% of aromatic hydrocarbon oil, thus forming a normal printing ink, and thereafter mixing into said normal ink, without shearing action, at least 2% by weight of a finely divided addition product of a swelling bentonite and a quaternary nitrogen compound containing a chain of at least 12 carbon atoms, thereby forming a dispersion having a fluid consistency but convertible to a substantially gelatinous consistency by shearing it between rotating rollers.

4. An anti-misting printing ink comprising a dispersion, in a liquid ink vehicle consisting essentially of liquid hydrocarbon containing at least about 15% of aromatic hydrocarbon oil, of a finely divided carbon pigment and a finely divided addition product of a swelling bentonite and 1 hydroxy ethyl, 2 heptadecenyl glyoxalidine acetate, said dispersion normally having a fluid consistency but being convertible into a substantially gelatinous consistency by shearing it between rotating rollers.

5. An anti-misting printing ink comprising a dispersion, in a liquid ink vehicle consisting essentially of liquid hydrocarbon containing at least about 15% of aromatic hydrocarbon oil, of a finely divided carbon pigment and a finely divided addition product of a swelling bentonite and 1 amino ethyl, 2 heptadecenyl glyoxalidine acetate, said dispersion normally having a fluid consistency but being convertible into a substantially gelatinous consistency by shearing it between rotating rollers.

References Cited in the file of this patent

UNITED STATES PATENTS

| | | |
|---|---|---|
| 1,447,734 | Schwenterley | Mar. 6, 1923 |
| 2,559,398 | Capell | July 3, 1951 |
| 2,622,987 | Ratcliffe | Dec. 23, 1952 |

FOREIGN PATENTS

| | | |
|---|---|---|
| 4,419 | Great Britain | 1914 |
| 226,164 | Great Britain | Sept. 10, 1925 |

OTHER REFERENCES

Wolfe: "Printing and Litho Inks" (1941), pp. 324, 325, 327.